United States Patent
Kitano et al.

(10) Patent No.: US 7,067,029 B2
(45) Date of Patent: Jun. 27, 2006

(54) METHOD FOR MANUFACTURING AN OPTICAL DISC INCLUDING A SINGLE LAYERED DISC AND A FOUR LAYERED ADHESIVE SHEET MEMBER FOR USE THEREIN AS WELL AS A ROLLED MEMBER THEREOF

(75) Inventors: Ryoko Kitano, Komatsushima (JP); Masami Inouchi, Komatsushima (JP)

(73) Assignee: Kitano Engineering Co., Ltd., Komatsushima (JP)

( * ) Notice: Subject to any disclaimer, the term of this patent is extended or adjusted under 35 U.S.C. 154(b) by 155 days.

(21) Appl. No.: 10/220,349

(22) PCT Filed: Dec. 26, 2001

(86) PCT No.: PCT/JP01/11451

§ 371 (c)(1), (2), (4) Date: Nov. 12, 2002

(87) PCT Pub. No.: WO02/054399

PCT Pub. Date: Jul. 11, 2002

(65) Prior Publication Data

US 2003/0116266 A1 Jun. 26, 2003

(30) Foreign Application Priority Data

Dec. 28, 2000 (JP) ........................................ 2000-402268
Jun. 15, 2001 (JP) ........................................ 2001-182565

(51) Int. Cl.
*B31B 31/00* (2006.01)
*B31B 31/04* (2006.01)
*G11B 7/26* (2006.01)

(52) U.S. Cl. ............... 156/247; 156/249; 156/306.6; 156/250; 156/256; 369/286

(58) Field of Classification Search ......... 156/247–250, 156/286, 306.6, 556, 581, 256, 267, 288, 156/538, 539–542; 369/281, 286; 428/40.1, 428/41.7, 41.8, 42.2
See application file for complete search history.

(56) References Cited

U.S. PATENT DOCUMENTS

| 4,879,710 | A  | * | 11/1989 | Iijima ........................ 369/291 |
| 5,980,677 | A  |   | 11/1999 | Amo et al. |
| 6,004,420 | A  |   | 12/1999 | Nakamura et al. |
| 6,168,682 | B1 | * | 1/2001  | Bennett et al. ............. 156/295 |
| 6,200,402 | B1 |   | 3/2001  | Amo |
| 6,309,727 | B1 | * | 10/2001 | Mueller et al. ............ 428/64.1 |
| 6,527,904 | B1 | * | 3/2003  | Maruyama et al. ....... 156/275.5 |

FOREIGN PATENT DOCUMENTS

| EP | 0 384 041 A1 | 8/1990 |
| JP | 10-208314 | 8/1998 |
| JP | 10-275368 | 10/1998 |
| JP | 2000-067468 | 3/2000 |

OTHER PUBLICATIONS

Abstract along with machine translation of for JP 2000–067468 (Mar. 3, 2000).*

* cited by examiner

*Primary Examiner*—Sue A. Purvis
(74) *Attorney, Agent, or Firm*—Flynn, Thiel, Boutell & Tanis, P.C.

(57) ABSTRACT

A method for manufacturing an optical disc. The method includes the steps of peeling a release paper from a four layered adhesive sheet member, which is composed of an elongated release paper, a protective sheet attached to the release paper, an adhesive layer formed on the protective sheet, and a release paper formed on the adhesive layer. A three layered adhesive sheet member which results from the peeling of the release paper is applied to the single layered disc, the protective sheet is transferred and bonded to the surface of the single layered discs and the elongated release paper is peeled off from the protective sheet bonded to the single layered disc to expose the protective sheet on the upper side of the single layered disc.

2 Claims, 8 Drawing Sheets

METHOD FOR MANUFACTURING AN OPTICAL DISC INCLUDING A SINGLE LAYERED DISC AND A FOUR LAYERED ADHESIVE SHEET MEMBER FOR USE THEREIN AS WELL AS A ROLLED MEMBER THEREOF

TECHNICAL FIELD

This invention relates to a method for manufacturing an optical disc, and more particularly, to an optical disc such as a digital video recorder (hereinafter referred to DVR) which is adapted so that a pit surface of the single layered disc is protected by a protective sheet.

BACKGROUND OF ART

Computers, personal computers and the like have recently been remarkably popular and accordingly storage mediums for use therein, especially the capacity of the optical disc has been highly densified more and more, thereby requiring many types thereof.

As for the optical disc, there are, for example, a digital video disc-random access memory, and a digital video disc-random memory (hereinafter referred to as DVD-RAM, DVD-RW and the like, all of which are manufactured by laminating two discs.

Notwithstanding, outstanding performance, for example, not only greater memory capacity but also high capacity of the optical disc which includes a single layered disc (the so-called DVD) is required.

This type of DVR has memory capacity approximately five times as much as the conventional DVD, for example, 22.5 gigabytes.

The optical disc in the form of DVR has been so dimensioned that its thickness is 1.2 mm, external diameter is 120 mm, and the internal diameter of its center hole is 15 mm.

Its sectional configuration is such that an information applied pit is formed on one side of a single layered disc, and that the pit is protected and covered by resin material.

The protective layer is of 0.1 mm and is adapted to read out information applied to the pit by means of a blue laser of a wave length, for example of 405 nanometers.

Now, for manufacturing the optical disc which is formed with the protective layer by means of this type of resin material, there is a method which is composed of the steps of applying ultraviolet light curable resin to the pit surface of the single layered disc, thereafter rotating the single layered disc to develop ultraviolet light curable resin on the surface of the single layered disc, and finally irradiating the ultraviolet light thereto and curing the same.

However, this method when used does not necessarily develop the ultraviolet light curable resin on the single layered disc as a whole evenly.

In this connection, it is noted that this type of DVR requires an extremely uniform protective layer if the aforementioned blue laser is used since the distance to the recording layer is specified as 0.1 mm.

Furthermore, an adhesive may be outwardly scattered at any rate by centrifugal force to cause circumferential stains while being scattered and lost which lowers an effective usage rate.

Still more, means or the like for irradiating the ultraviolet light, i.e. a large scaled device or means for forming the protective layer are required, thereby increasing costs.

In view of the aforementioned, a method for manufacturing DVR is necessitated without requiring a step for developing the adhesive as mentioned hereinbefore.

The present invention is provided to solve the aforementioned problem.

More specifically, it is an object of the present invention to provide a method for manufacturing an optical disc for readily and simply forming a protective layer on the single layered disc.

A further object of the invention is to provide a four layered adhesive sheet member for use as well as a rolled member.

In view of the aforementioned problems, as a result of concentrated research thereon, such problem has been readily and uniformly solved more than as expected by employing an adhesive sheet consisting of a four layered adhesive sheet member.

More specifically, a first aspect of the invention resides in a method for manufacturing an optical disc to allow a protective sheet with an adhesive layer to abut against a single layered adhesive sheet member, and then a protective sheet is bonded to the single layered disc.

A second aspect of the invention resides in the method for manufacturing an optical disc wherein there is provided an elongated release paper, a protective sheet temporarily attached to the elongated release paper, an adhesive layer on the protective sheet, a release paper tacked to the adhesive layer, wherein the release paper is allowed to expose the adhesive layer, a three layered adhesive sheet from which the release sheet is released is adapted to abut against the surface of the single layered disc to transport and bond the surface of the single layered disc, and wherein the elongated release paper is released from the protective sheet bonded to the single layered disc to thereby expose the protective sheet on the single layered disc.

A third aspect of the invention resides in the method for manufacturing an optical disc wherein the adhesive layer is exposed by releasing the release paper from the four layered adhesive sheet composed of an elongated release paper, a protective sheet temporarily attached to the elongated release paper, an adhesive layer on the protective sheet, a release paper temporarily adhered to the adhesive layer, wherein the release paper is released from the four layered adhesive sheet to abut against the surface of the single layered disc to transport and bond the surface of the single layered disc through the adhesive layer, and wherein the elongated release paper is released from the protective sheet bonded to the single layered disc to thereby expose the protective sheet on the single layered disc and thereafter, the single layered disc is pressured by an atmosphere of an air pressure to eliminate air bubble.

A fourth aspect of the invention resides in the method for manufacturing an optical disc wherein the adhesive sheet member is so pressed against the single layered disc as to enlarge the area of contact therebetween from the center to the outside when the three layered adhesive sheet member abuts against the surface of the single layered disc.

A fifth aspect of the invention resides in the method for manufacturing an optical disc wherein the adhesive sheet member is pressed against the single layered disc by a roller when the three layered adhesive sheet member abuts against the surface of the single layered disc.

A sixth aspect of the invention resides in the method for manufacturing an optical disc wherein the protective sheet is formed of polycarbonate resin.

A seventh aspect of the invention resides in the method for manufacturing an optical disc wherein a release paper is polyethylene terephthalate resin as processed by silicone.

A eighth aspect of the invention resides in the method for manufacturing an optical disc wherein an elongated release paper is polyethylene terephthalate resin as processed by silicone.

A ninth aspect of the invention resides in the method for manufacturing an optical disc wherein pneumatic pressure is more than 10 kg/cm$^3$.

A tenth aspect of the invention resides in the four layered adhesive sheet which is employed when the optical disc is manufactured wherein said four layered adhesive sheet member comprises an elongated release paper, a protective sheet adapted to longitudinally, temporarily adhere to the elongated release paper at regular intervals, an adhesive layer formed on the protective sheet, and a release paper adapted to temporarily adhere to the adhesive layer and wherein an opening is bored through the four layered adhesive sheet.

The eleventh feature of the invention resides in a four layered adhesive sheet member wherein the protective sheet is formed of polycarbonate resin whereas the adhesive layer of the protective sheet is formed of acrylic adhesive.

The twelfth feature of the invention resides in the roll member formed by winding the four layered adhesive sheet member used for manufacturing the optical disc into a cylinder in a mandrel form which is employed when the optical disc is manufactured wherein said four layered adhesive sheet member comprises an elongated release paper, a protective sheet adapted to longitudinally, temporarily adhere to the elongated release paper at regular intervals, an adhesive layer formed on the protective sheet, and a release paper adapted to temporarily adhere to the adhesive layer, and wherein an opening is bored through the four layered adhesive sheet.

The thirteenth feature of the invention resides in the rolled member wherein the four layered adhesive sheet member is wound around a mandrel cylinder with a center hole through the non-adhesive attached sheet.

So long as the invention conforms to the aforementioned objects, the invention may be practiced in combination with more than two defined arrangements selected from the aforementioned aspects 1–13.

The specifications of the four layered adhesive sheet member are selected optionally for the desired amount of protective thickness.

By use of the four layered adhesive sheet member, a uniform protective layer may be formed.

The thickness of the protective layer on the single layered optical disc may be readily changed by only changing the thickness of protective sheet 1B, the protective layer may be formed evenly on the surface of the single layered disc without any air bubbles or creases. Due to the use of the four layered adhesive sheet, a more effective optical disc may be possibly obtained.

In other words, different from lamination with a conventional ultraviolet curable resin, this invention does not necessitate the step of developing the adhesive and of irradiating with an ultraviolet beam, thereby curtailing numbers of manufacturing steps or processes.

DETAILED DESCRIPTION

Now, a method of manufacturing an optical disc of a single layered disc by use of a four layered adhesive sheet member according to the invention will be described hereinafter.

Initially, the adhesive sheet member will be described.

Figure 1:
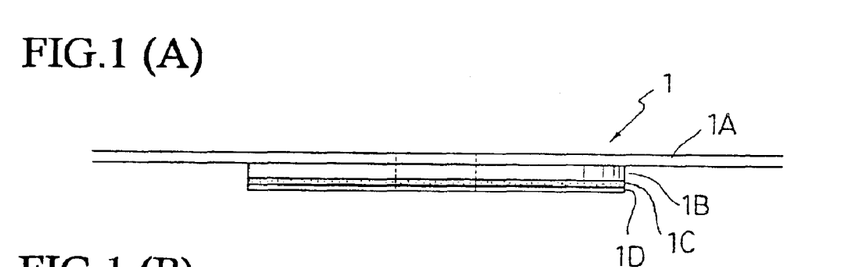
FIGS. 1(A) and 1(B) are a side view and a front view, respectively, of the four layered adhesive sheet member.

FIG. 1 shows a representation of the four layered adhesive sheet member.

FIG. 1(A) is a side view thereof, and FIG. 1(B) is a plan view thereof.

Herein, the four layer adhesive sheet member, the single layered disc, and the optical disc those of which as a matter of convenience and for facilitating the understanding are shown in a manner of exaggeration of their thickness (for this reason, it is not necessarily accurate with respect to relation between length and breadth of magnification).

A four layered adhesive sheet member 1 used herein is a multilayered adhesive sheet member which is composed of an elongated release paper 1A, the protective sheet 1B [the elongated release paper 1A is temporarily adhered to the protective sheet 1B by an adhesive layer, (for example, acrylic pressure sensitive adhesive layer) not shown, in thickness on the order of 2~3 μm ], an adhesive layer 1C, and a release paper 1D allowed to temporarily adhere to the adhesive layer, the elongated release paper 1A being integrally formed with the protective sheet 1B, the adhesive layer 1C, the release paper 1D superposed thereon and bonded thereto at a distance.

The protective sheet 1B, the adhesive layer 1C, and the release paper 1D are in a form of a long sheet and many of them are temporarily bonded longitudinally at a certain distance from one another to the surface of the elongated release paper 1A. The release paper 1A is made of an elongated synthetic resin tape and serves as a base of the four layered adhesive sheet member 1, which is a so called "carrier".

The elongated release paper 1A includes the protective sheet 1B temporarily attached thereto.

The protective sheet 1B, as will be later described, is so arranged to transfer from the elongated release paper 1A and then adhere to the single layered disc 2 to protect a bit surface thereof.

The elongated release paper 1A and the protective sheet 1B may be both temporarily attached by an acrylic adhesive layer.

The adhesive layer 1C is provided with the surface to interpose between the single layered disc 2 and the protective sheet 1B to bond both of them.

The release paper 1D is temporarily attached to the adhesive layer 1C to cover the surface therewith thus preventing the adhesive layer from staining the latter.

The four layered adhesive sheet member 1 is formed in its center with a hole H bored through the elongated release paper 1A, the protective sheet 1B, the adhesive layer 1C, and the release paper 1D simultaneously to correspond to the hole in the single layered disc 2.

In this connection, it is noted that the hole H is used when the four layered adhesive sheet member 1 is positioned with respect to a holding table.

Typically, preferably the four layered adhesive sheet member 1 may employ, for example, a thin paper material such as polyethylene or the like and be, for example, up to 50 μm.

As for the protective sheet 1B, a thin paper material such as polycarbonate resin which is excellent in hardness and strength to sufficiently protect a pit surface of the single layered disc is employed in thickness, for example 70 μm.

The adhesive layers 1C such as, for example, mainly, pressure sensitive adhesives, for example, rubber adhesive, acrylic adhesive, silicone adhesive, vinyl adhesive and the like are employed, and each of them is of a thickness of, for example, 30 μm.

PET (polyethylene terephthalate) and the like is employed as the release paper 1D and is dimensioned to have a thickness of 50 μm.

Incidentally, the thickness of each of the elongated release paper 1A, the protective sheet 1B, the adhesive layer 1C, especially, the protective sheet 1B and the adhesive layer 1C, may be selected to provide optimum thickness according to types of the optical discs to be designed.

Stated otherwise, it is advisable to select optimum specifications of the four layered adhesive sheet member.

Next, the method for manufacturing the optical disc D by laminating the four layered adhesive sheet member 1 to the single layered disc 2 will be described according to the respective steps.

FIGS. 2(A)~FIG. 2(E) shows successively the steps for manufacturing the optical disc according to the invention.

Figure 2:
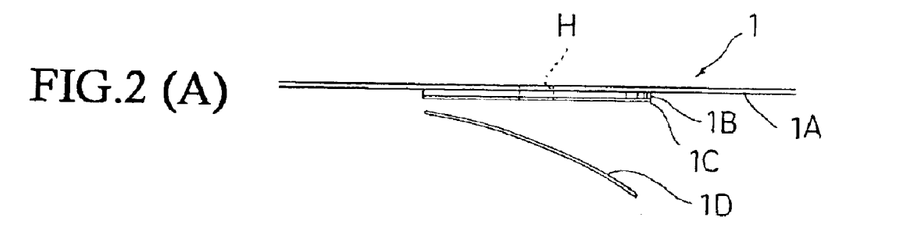
FIGS. 2(A), 2(B), 2(C), 2(D), and 2(E) are schematic views of each stage of production of the optical disc according to the present invention.

1. Initially, provision is made for the single layered disc 2 with a pit surface to which the information is applied, and the aforementioned four layered adhesive sheet member 1.

2. Peeling the release paper 1D from the four layered adhesive layer to leave the three-layered adhesive sheet member S, thereby exposing the adhesive thereunder layer 1C [see FIG. 2(A)].

3. The three layered adhesive sheet member S is located upwardly of the single layered disc 2 carried on the holding table 3 [see FIG. 2(B)]. In this case, the hole H may be available but not detailed.

4. A hold-down member is pressurized from the upper of the three layered adhesive sheet member to abut the latter against the surface of the single layered disc 2 [see FIG. 2(C)].

Figure 3:
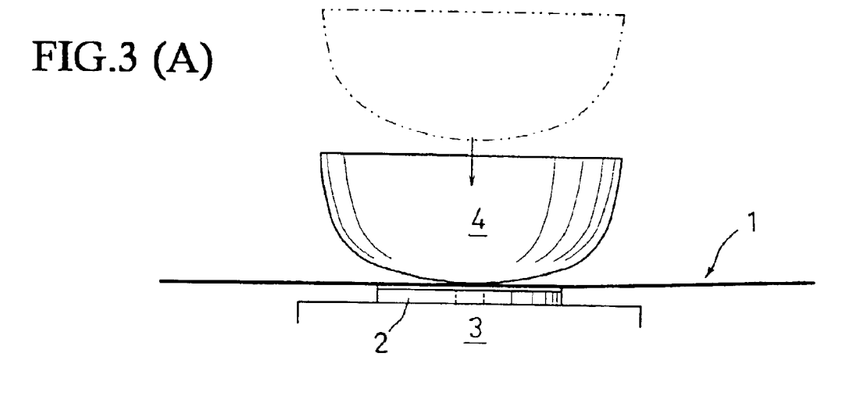
FIGS. 3(A) and 3(B) are schematic views showing the manner in which the disc is pressurized by use of a flexible pressure member.
Figure 4:
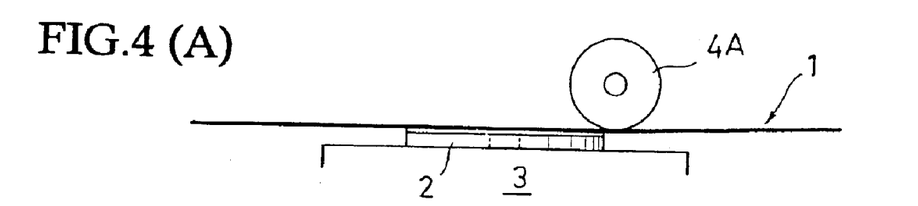
FIGS. 4(A) and 4(B) are schematic views showing the manner in which the disc is pressurized by use of a roller type of pressure member.

FIGS. 3 and 4 illustrated a manner in which the adhesive sheet member is depressed by the hold down member.

FIG. 3 shows a manner in which the single layered disc is held down by a flexible hold down member.

FIG. 4 shows a manner in which the single layered disc is pressed down by a roller type of a hold down member.

The former is adapted so that a semi hemispheric shaped flexible hold down member 4 first contacts the central portion of the adhesive sheet member and presses same against the single layered disc in such a manner that the contact area between the adhesive sheet member and the single layered disc is enlarged from the center outwardly [see FIG. 3(A)→FIG. 3(B)].

In this instance, air bubbles and the like disposed between the three layered adhesive sheet member and the single layered disc 2 are exhausted from the circumference to the open air.

The latter is arranged so that the three layered adhesive sheet member is successively contact bonded by the roller 4A from one end to the other end [see FIG. 4(A)→FIG. 4(B)].

In the aforementioned manner, according to the aforementioned pressing action, the adhesive layer 1C of the three layered adhesive sheet member is transferred and attached to the pit surface of the single layered disc 2.

5. Next, the elongated release paper 1A is peeled from the three layered adhesive sheet member to obtain the two layered adhesive sheet member.

As a result, the protective sheet 1B adhesively bonds to the upper area of the single layered disc 2 through the adhesive layer 1C, thus forming the protective layer [see FIG. 2(D)].

6. Now, the single layered disc 2 with the protective layer as formed is placed in an atmosphere under a certain air pressure and subjected to pressure application [see FIG. 2(E)].

In this case, as shown, preferably, the single layered disc 2 is positioned within a pressure container 5 while placed on the holding table 3 and being subjected to the air pressure.

The air pressure serves to exhaust the air contained in the adhesive layer.

Figure 5:
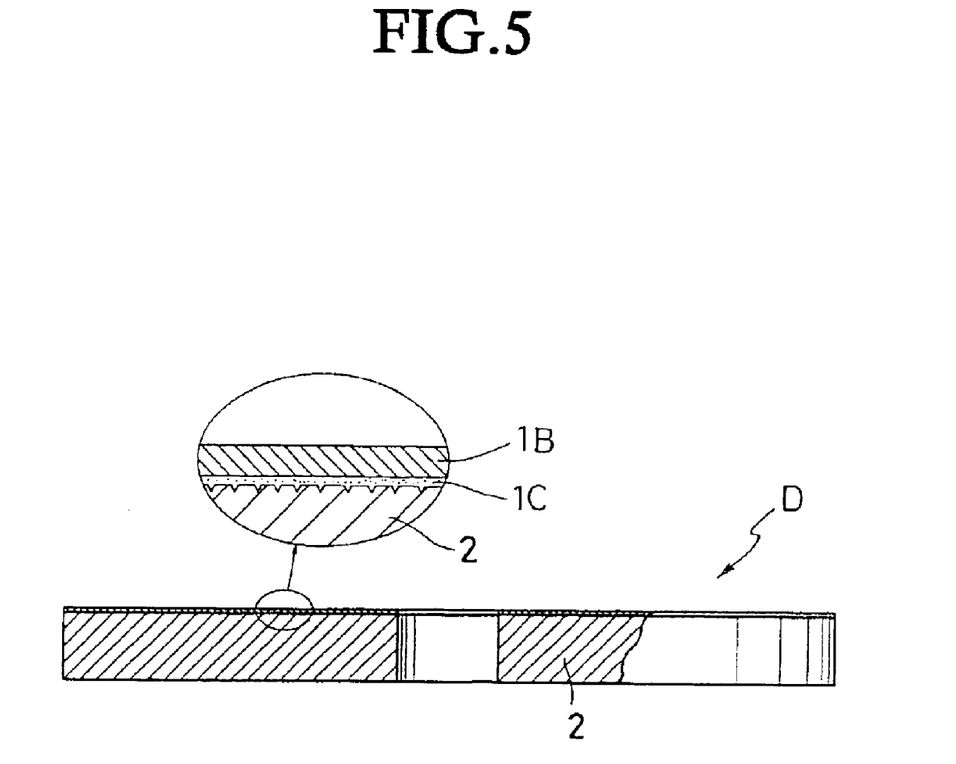
FIG. 5 is a schematic view of an optical disc of a single layered disc in accordance with the present invention.

The applied pressure in this instance, preferably, more than 10 kg/cm$^2$ [980665(Pa)] may be employed in view of efficiency of exhaust of the air bubbles (see FIG. 5).

As for the optical disc D, the protective layer formed on the surface (one side) is extremely uniform since the protective layer is in a condition in which the protective sheet 1B is held applied to the surface of the single layered disc 2 by the adhesive so that uniformity may be guaranteed so long as the protective sheet 1B to be used is uniform.

Finally, the actual condition of the adhesive sheet member according to the present invention will be described hereinafter.

Figure 6:
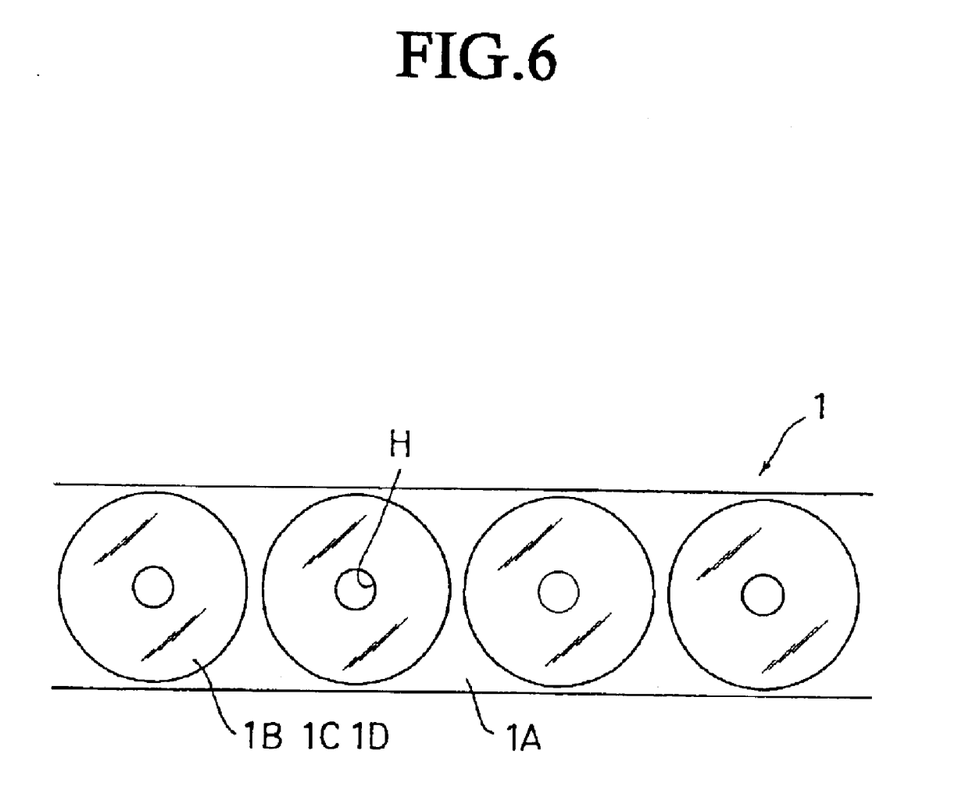
FIG. 6 is a plan view of a four layered adhesive sheet member used by a method for manufacturing the optical disc.

FIG. 6 is a plan view of the four layered adhesive sheet member used in the method for manufacturing the optical disc.

Figure 7:
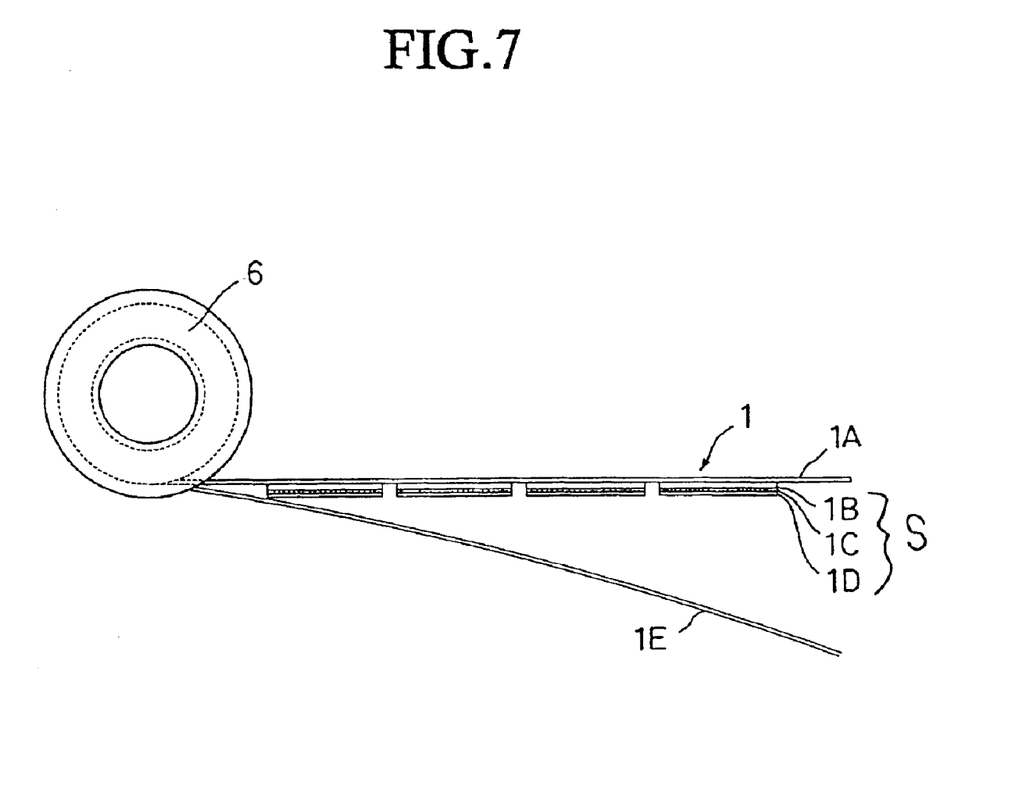
FIG. 7 is a side view of each of the four layered adhesive sheet member fed out from the mandrel cylinder.

FIG. 7 is a side view showing the four layered adhesive sheet which is fed out from the mandrel cylinder.

Figure 8:
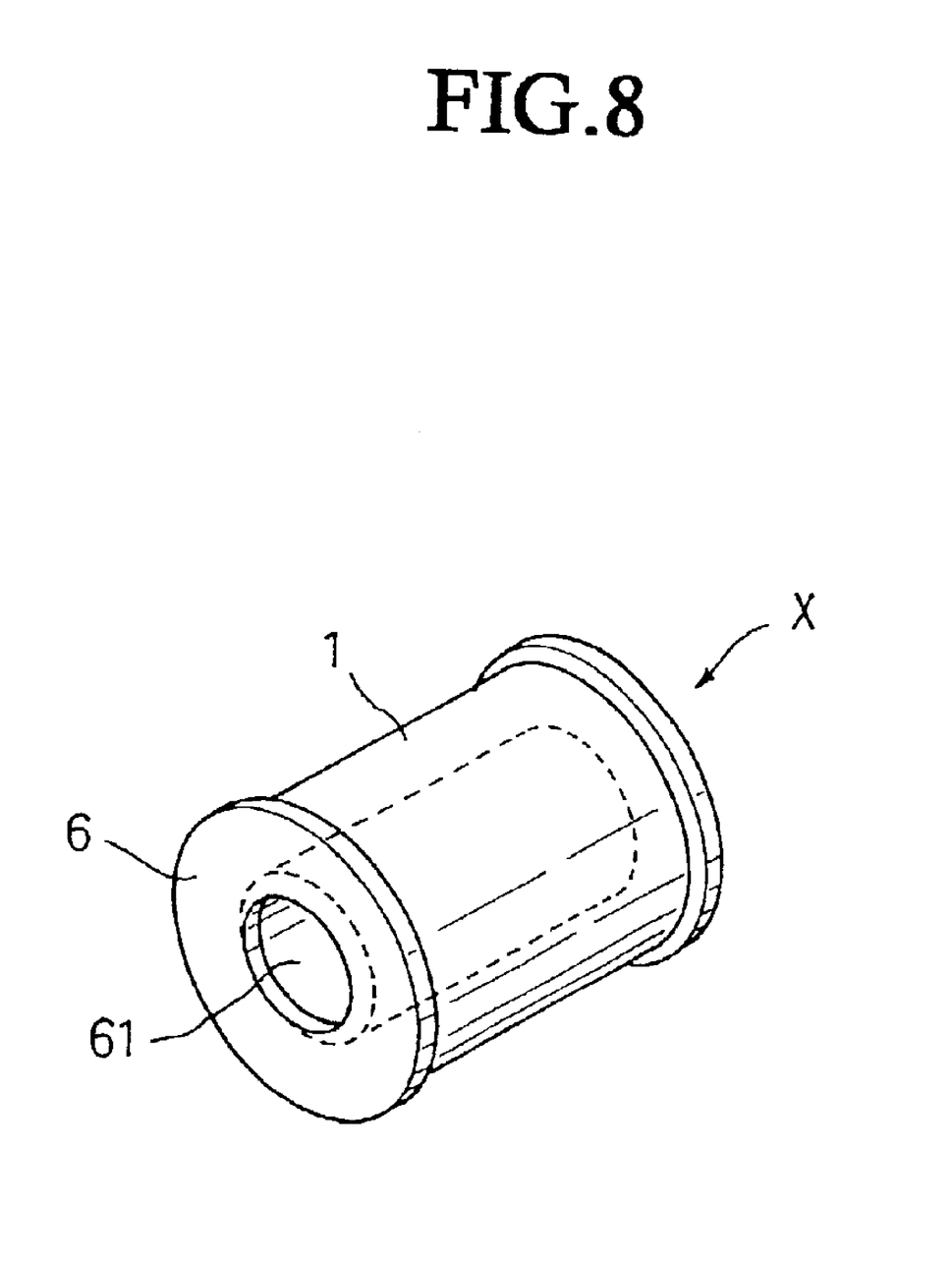
FIG. 8 is a perspective view of a roll member wound with the four layered adhesive sheet member.

FIG. 8 is a perspective view showing the rolled member around which the four layered adhesive sheet member is wound.

The four layered adhesive sheet member 1 comprises the elongated release paper 1A, the protective sheet 1B, the adhesive layer 1C formed on the protective sheet, and the release paper 1D temporarily attached to the adhesive layer.

It is, however, noted that these are in the form of the rolled member X which are convenient for feeding them out when the protective sheet is transferred and bonded to the surface of the single layered disc.

The rolled member X is so fabricated as to wind the release paper around collared mandrel cylinder 6 by non-adhesive attached paper 1E in thickness on the order of 60 μm, for example, (normally so called "interleaving paper") so as prevent inadvertently peeled release paper from sticking to the back side of the elongated release paper 1A.

In this manner, the elongated four layered adhesive sheet member 1 is fabricated to form the rolled member X to feed out the member in a smooth manner.

Occasionally speaking, a support shaft as a part of the optical disc manufacturing apparatus is inserted into a mandrel hole 61 of the collared mandrel cylinder 6 to rotatably support the rolled member X assuming a posture of standing by or ready to feed out.

Although the invention has been described in detail, it is not limited to only the embodiment disclosed herein, it is needless to say that various modification may be made without departing from the spirit and scope of the invention.

For example, it is not necessary to take the step as stated in Item 6, in which the single layered disc is placed in an atmosphere of air pressure to press it.

In other words, this step if applied, provides a high quality optical disc D.

This invention relates to a method for manufacturing an optical disc composed of a single layered disc.

This may be applicable to an optical disc (Digital Video Recorder) whose pit surface is protected by a protective sheet.

This invention may be applicable to any memory disc without departing from its principal and adaptable to any field so long as the same effect may be expected.

What is claimed is:

1. A method of manufacturing an optical disc comprising the steps of:

forming a four-layer adhesive sheet member by providing an elongated first release paper formed of a polyethylene terephthalate resin which is processed to have a silicone layer, temporarily attaching a plurality of circular protective sheets formed of a polycarbonate resin to the first release paper at fixed longitudinal intervals, forming an adhesive layer of an acrylic adhesive on the protective sheets and temporarily attaching a second release paper of a polyethylene terephthalate resin which is processed to have a silicone layer to the adhesive layer;

forming a plurality of holes in the adhesive sheet member adjacent each protective sheet such that each hole penetrates all four layers of the adhesive sheet member;

winding the adhesive sheet member around a mandrel cylinder utilizing a non-adhesive paper interposed between the first and second release papers;

feeding the adhesive sheet member from the mandrel cylinder;

thereafter releasing the second release paper from the adhesive sheet member to expose the adhesive layer and thereby form a three-layer adhesive sheet;

pressing the three-layer adhesive sheet against the surface of a single-layer disc with a roller to transfer and bond the protective sheet on the surface of the single-layer disc through the adhesive layer;

thereafter releasing the first release paper from the protective sheet bonded to the single-layer disc to expose the protective sheet; and thereafter placing the single-layer disc in a pressure enclosure and pressurizing same to remove air bubbles.

2. The method of claim 1, wherein said step of pressurizing includes pressurizing the single-layer disc at a pressure greater than 10 kg/cm$^3$.

* * * * *